United States Patent Office 2,878,539
Patented Mar. 24, 1959

2,878,539

BONDING INORGANIC GRANULES

Benjamin D. Halpern, Jenkintown, and Howard E. Hoyt, Huntingdon Valley, Pa., assignors to The Borden Company, a corporation of New Jersey No Drawing. Application April 5, 1956
Serial No. 576,234

5 Claims. (Cl. 22—193)

This invention relates to a process and composition for bonding inorganic granules into rigid continuous forms, such as core and shell molds and grinding wheels. The invention is particularly useful in connection with foundry sand and will be first illustrated, therefore, by description in connection with such use.

This invention differs from prior art in making unnecessary the use of flammable and hazardous solvents or, on the other hand, the use of elevated temperatures to convert the original thermoplastic novolak to a chemically different state by reaction with hexamethylenetetramine or other curing agent. In our invention we deposit the resin in solid state on the inorganic granules by the simple physical operation of mixing preconditioned granules to be coated with a composition consisting of a viscous dispersion of phenoplast and water together with curing agent, while evaporating at room temperature or slightly above to a free-flowing state.

Briefly stated, the invention comprises mixing the inorganic granules to be bonded with a small proportion of a preconditioning liquid that is a non-solvent for the granules and then with an aqueous phenoplast dispersion (sometimes called "emulsion") and curing agent, continuing the mixing, under conditions causing evaporation of the said liquid and the water in the said emulsion, until the resin and curing agent are distributed practically uniformly over the surface of the granules and until the water is largely evaporated, so that the product is free flowing, then shaping this mixture to the desired form, heating the shaped material to curing temperature, and maintaining such temperature until bonding is effected. In the preferred embodiment of the invention, there is introduced also a lubricant in the form of finely divided solid particles, these particles being maintained in solid form throughout the mixing and evaporation by keeping the temperature at a point not only below that of curing or reaction of the phenoplast, but also below that of fusion or solution of the lubricant in the phenoplast.

The invention makes feasible and practical the use of the crude relatively viscous liquor obtained in novolak manufacture, without washing, neutralizing, or stripping from normally undesired components, satisfactory distribution over the sand, and after curing with a curing agent a firm sand form of strength, with as little as 2% of the binder, as high or higher than obtained conventionally with 5% of binder.

As to the materials used, the inorganic granules are suitably but not necessarily mineral. Examples of granules that illustrate the class to be used are foundry or other sand, Corundum (aluminum oxide), Carborundum, zirconia, and glass particles.

As the phenoplast we use a phenol-aldehyde condensation product in the form of an emulsion with water. We obtain particularly satisfactory results when the dispersion is one in which a novolak resin is the continuous phase and water is dispersed therein in the proportion of about 10–25 parts for 100 parts of the total dispersion, the acidity of this dispersion corresponds to a pH less than 4 and for best results 1–3, and the viscosity of the novolak resin dispersion is relatively high, as for example 1,500–40,000 poises at 20° C. With such viscosity, we avoid stickiness of the resin that, if present, is objectionable in the mixed material. The low pH increases the strength of the final bonded product. The phenoplast is made by condensing phenol with formaldehyde, with hydrochloric or other catalyst and with a low proportion of formaldehyde such as 0.7–0.9 mole to 1 of phenol, continuing the condensation to the stage at which the condensation product separates from the aqueous liquor, and then continuing the condensation while the product is somewhat hydrophilic.

In place of the phenol-formaldehyde condensation product, we may use the corresponding formaldehyde condensate with cresol, xylenol, and resorcinol. Other thermosetting materials that may be used are urea-formaldehyde resins and epoxy resins such as the reaction product of chlorohydrin with bis-phenol A.

The water used for the preconditioning has obviously high solvent power for itself and also appreciable dissolving power for free phenol, both water and free phenol being components of the phenoplast material.

As the curing agent we use hexamethylenetetramine. We do not know of any curing agent that is more desirable for this purpose.

The lubricant is a finely divided solid that melts, if at all, only at temperatures above 100° C., is non-reactive chemically with other components of our composition, and may be either soluble or insoluble in the selected phenoplast. Examples of lubricants that we may use are the parting agents such as calcium or zinc stearate, talc, graphite, higher fatty acid amides, diamides, glycerine fatty esters, and silicone oils.

As to proportions, the water that is mixed with the granules, in the preconditioning step, should be sufficient barely to dampen the surface of the grains. The dampening is adequate when the phenoplast emulsion subsequently admixed distributes itself substantially uniformly over the granules. Suitable proportions are within the range of 0.1%–1%, ordinarily 0.3%–0.8%, of the weight of the sand. Larger proportions than 1% of water, if added, increase the subsequent time or expense in evaporation of the water during the mixing step. The actual proportions of water to be admixed varies somewhat with the nature of the sand used. Sand that is excessively fine, has relatively large specific surface area or contains substantial proportions of clay, will require larger amounts of the conditioning liquid, within the range stated, than sand in the form of larger particles, more rounded grains of relatively low surface area for unit of weight, and substantially free from clay and other excessively fine material.

The phenoplast resin likewise will vary somewhat in proportion used with the character of the sand, in the same order as the proportion of the non-solvent varies with the nature of the sand. Suitable proportions of the phenoplast resin are 1–6 parts by weight for 100 of the sand.

The curing agent is used in conventional proportions, as for instance 5–20 parts for 100 parts of the phenoplast resin on the dry basis.

The lubricant, when used, is introduced in the proportion of about 0.1%–1% of the weight of the sand. 0.5% is ordinarily adequate.

As to conditions, it is important that the sand be mixed with the water or other conditioning liquid at the outset of the compounding operation. Then the other components are admixed, suitably the dispersion of the phenoplast next, and then the curing agent and the lubricant, if any. The mixing is effected under conditions permitting escape of vapor of volatile materials to the atmosphere, as in a muller or other mixer that is open to the atmosphere or provided with a blower for forced circulation of air during the mixing or evaporation stage. During this mixing and evaporation, the temperature is maintained at all times below that of fusion or dissolving of the lubricant in the phenoplast, as within the range 10°-60° C.

The invention will be further illustrated by description in connection with specific examples of the practice of it. In these examples, the percentages shown are on the weight of the sand. Proportions here and elsewhere herein are expressed as parts by weight unless specifically stated to the contrary.

Viscosities of the phenoplast emulsions at 20° C., expressed as poises, were 9,660 in Example 2 and 2,830 in the other examples.

The proportions of formaldehyde used in making the phenoplasts was 0.713 mole for 1 mole of the phenol, proportions within the range 0.7 to 0.8-0.9 being suitable. The condensation catalyst was sulfuric acid. No external heat was applied except in final curing.

The examples follow.

*Example 1*

4,000 parts of clean silica sand of 136AFS fineness was charged to an 18 inch diameter Simpson laboratory muller.

0.6% (24 parts) of water (preconditioning agent) was mulled into the sand. After 1 minute, mulling was interrupted and 3.9% (156 parts) of novolak resin dispersion (representing the crude liquor from the condensation and containing about 15 parts dispersed water) was charged to the muller as a viscous liquid and mulling resumed. After 5 minutes a pronounced build-up or swelling of the mixture was observed. At this point there was added 0.35% (14 parts) of dry pulverized hexamethylenetetramine uniformly premixed with 0.175% (7 parts) of a wax formed from reacting 1 mole of ethylene diamine with 2 moles of stearic acid, as for example Nopcowax 22DS.

After a total mulling time of 25 minutes at room temperature, the mass became free-flowing and was discharged from the muller. 0.15% of bis-stearamide of ethylene diamine, as lubricant, was then admixed. The product was virtually dust-free and the sand grains, under microscopic examination, appeared smooth and uniformly coated.

The mass was shaped and then heated, to cause curing of the resin binder composition, now substantially uniformly mixed with the sand. Test specimens of the product by the dump box operation showed after curing tensile strength of 636 p.s.i.

*Example 2*

The procedure of Example 1 was followed except that the materials and proportions were as follows:

| Components: | Parts |
| --- | --- |
| Clean silica sand (AFS) | 100 |
| Dipropylene glycol | 0.15 |
| Viscous novolak dispersion | 3.6 |
| Hexamethylenetetramine | 0.32 |

Marked build-up or swelling of the mixture was again observed at an early stage in the evaporation, at which stage lubricant was added as in Example 1. The mass mulled out in 25 minutes to a free-flowing condition.

Tensile bars on the coated sand made by dump box procedure, after being heated to cure, showed 660 p.s.i. tensile strength.

*Example 3*

This example illustrates poor results when the process of invention was not followed.

4000 parts of clean silica sand was charged to an 18-inch diameter Simpson laboratory muller. No preconditioning agent was used.

3.6% (144 parts) of novolak emulsion (containing 21.8 parts of dispersed water) was charged to the muller as a viscous mass. After a few minutes' mulling, during which the build-up or swelling failed to occur, there was admixed 0.36% of hexamethylenetetramine (14.4 parts) as a fine powder.

The mixture was mulled out to free-flowing as in Examples 1 and 2. Small lumps or discs of undistributed resin were noted.

Test specimens of the molded and cured product showed a tensile strength of 144 p.s.i. which experience has shown is too weak for any useful application.

*Example 4*

The procedure of any of the Examples 1-2 above is followed except that the lubricant is omitted. Firm, bonded cores or shells are obtained.

*Example 5*

The procedure of Examples 1-4 is followed except that the novolak there used is replaced by an equal weight, on the dry basis, of any of the other thermosetting resinous products disclosed herein, the said products being used in aqueous dispersion.

*Example 6*

The procedure of Example 1 is followed except that the water there used, as the preconditioning agent, is replaced by an equal weight of a resole (alkali catalyzed phenolformaldehyde condensate) in 70% concentration in aqueous solution.

In a modification of Examples 1, 2 or 6, the temperature is raised during the mixing to a point not over about 50° C. so as to accelerate the evaporation of volatile components of the applied materials, without causing reaction of the novolak with the curing agent, that is, without advancing the resin.

In another modification of Examples 1-3 and 6, the resin dispersion used is replaced by an equal weight, on the dry basis, of novolak dispersed in the proportion of about 20-30 parts in sufficient water to make 100 parts of dispersion and the lubricant is replaced by any equal proportion of any one of the other lubricants listed herein.

In a modification of Example 1, the novolak there described is used in the proportion of 2%, on the dry basis. The bonded and cured sand form had a tensile strength of 460 p.s.i.

In general, the primary requirement for foundry use is that the sand be so firmly associated with resin that, when blown into a pattern cavity, resin and hexamethylenetetramine will not be blown or abraded off the sand and thereby give poorly bonded areas in the mold thus formed.

In order to appraise the quality of our mixes, a product made by the procedure of Example 2 was blown in a centrifugal or cyclone separator for 1 minute, to provide a condition simulating but somewhat exaggerating that encountered when foundry compositions are blown into a mold cavity. The blown sand was then screened through a 200-mesh screen, the material passing through the screen and that retained on the screen being analyzed by ignition for resin plus additives content. The material passing the 200-mesh screen was analyzed in addition for nitrogen according to the Kjeldahl method.

It is clear that any serious weakness of the sand and resin bond would result, on this procedure, in a segregation of resin and hexamethylenetetramine in the form of free, fine powder passing the 200-mesh screen. The following distribution was found by assay:

|  | Original | On 200 Mesh | Fines Through 200 Mesh |
|---|---|---|---|
| Weight, grams | 100 | 88.26 | 11.74 |
| Loss on Ignition (organic binder), percent | 3.43 | 3.19 | 5.29 |
| Hexamethylenetetramine by N analysis, percent | 0.32 | | 0.54 |
| Hexa. on weight of binder, percent | 9.3 | | 10.2 |

It can be seen that the total organic binder on the fines is no higher than would be expected considering that the finer sand presents more surface for coating. The hexa. content of the fines calculates to 10.2% of the organic coating. The hexa. content of the original calculates to 9.3% of the organic coating. This increase would represent a maximum of 2% loss of the total hexa. originally present on blowing, which would not be serious. No visual evidence of segregation of hexa. or resin was seen on the fines as examined under a microscope.

A sand coated in a usual process at a similar resin level (3.6%) gave, on the other hand, an assay of 22% ignition loss on the fines with evidence of resin segregation visible to the naked eye.

It is to be understood that it is intended to cover all changes and modifications of the examples of the invention herein chosen for the purpose of illustration which do not constitute departures from the spirit and scope of the invention.

The invention claimed is:

1. In bonding sand, the process which comprises preconditioning the sand by mixing therewith water in proportion adequate only to dampen the sand and at least 0.3% of the weight thereof, mixing the thus preconditioned sand with a dispersion of water and a thermosetting resin and also with a curing agent for the said resin, continuing the mixing until the dispersion and the curing agent are substantially uniformly distributed throughout the sand, subjecting the resulting mixed product to evaporation until water is evaporated to the stage at which the said dispersion is converted to a single phase coating over the sand particles, the temperature being maintained at all times during the mixing and evaporation below the temperature of reaction of the resin in contact with the curing agent, and then shaping the mass so obtained.

2. The process of claim 1 in which the said resin is novolak.

3. The process of claim 1 in which the said dispersion contains water as the dispersed phase of the final reaction liquor of novolak resin manufacture and is of pH less than 4.

4. In bonding foundry sand, the process which comprises mixing water into the sand in amount adequate only to dampen the sand and at least 0.3% of the weight thereof, mixing aqueous novolak dispersion with the dampened sand, evaporating water from the mixed mass until the mass becomes doughy and swells, admixing at this stage finely pulverized curing agent for the novolak, then continuing the mixing and evaporation to substantially complete evaporation of water, shaping the resulting free-flowing mass, and heating the shaped product to the temperature of curing of the novolak therein.

5. The process of claim 1 in which the preconditioning water applied to the sand is in the form of a mixture of water with the product of condensation of phenol with formaldehyde in alkaline medium to the resole stage.

References Cited in the file of this patent
UNITED STATES PATENTS

| | | |
|---|---|---|
| 2,706,163 | Fitko | June 5, 1953 |
| 2,662,067 | Less et al. | Dec. 8, 1953 |
| 2,683,296 | Drumm et al. | July 13, 1954 |
| 2,696,479 | Ossenbruggen et al. | Dec. 7, 1954 |

FOREIGN PATENTS

| | | |
|---|---|---|
| 700,763 | Great Britain | Dec. 9, 1953 |